(12) United States Patent
Hasegawa et al.

(10) Patent No.: US 10,964,926 B2
(45) Date of Patent: Mar. 30, 2021

(54) NONAQUEOUS ELECTROLYTE BATTERY AND BATTERY PACK

(71) Applicants: KABUSHIKI KAISHA TOSHIBA, Minato-ku (JP); Toshiba Infrastructure Systems & Solutions Corporation, Kawasaki (JP)

(72) Inventors: Aki Hasegawa, Tokyo (JP); Dai Yamamoto, Kashiwazaki (JP); Masataka Shikota, Kashiwazaki (JP); Toshitada Nakazawa, Kashiwazaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/451,837

(22) Filed: Jun. 25, 2019

(65) Prior Publication Data
US 2019/0334148 A1    Oct. 31, 2019

Related U.S. Application Data

(63) Continuation of application No. PCT/JP2017/046361, filed on Dec. 25, 2017.

(30) Foreign Application Priority Data

Dec. 26, 2016    (JP) ............................... JP2016-250979

(51) Int. Cl.
*H01M 10/052*    (2010.01)
*H01M 2/16*    (2006.01)
*H01M 4/505*    (2010.01)

(52) U.S. Cl.
CPC ........... *H01M 2/162* (2013.01); *H01M 4/505* (2013.01); *H01M 10/052* (2013.01)

(58) Field of Classification Search
None
See application file for complete search history.

(56) References Cited

U.S. PATENT DOCUMENTS

2010/0015530 A1    1/2010    Katayama et al.
2014/0120380 A1*   5/2014    Inagaki ............... C01G 33/006
                                                                    429/7

(Continued)

FOREIGN PATENT DOCUMENTS

CN    101047270 A    10/2007
EP    3 474 365 A1    4/2019

(Continued)

OTHER PUBLICATIONS

International Search Report dated Feb. 6, 2018 in PCT/JP2017/046361 filed Dec. 25, 2017 (with English Translation).

(Continued)

*Primary Examiner* — Haroon S. Sheikh
(74) *Attorney, Agent, or Firm* — Oblon, McClelland, Maier & Neustadt, L.L.P.

(57) ABSTRACT

According to one embodiment, provided is a nonaqueous electrolyte battery that includes a positive electrode, a negative electrode, a separator, and a nonaqueous electrolyte. The separator is disposed between the positive electrode and the negative electrode. The separator includes a fiber-made nonwoven fabric having a tortuosity of 1.8 to 3 and a vacancy of 40% to 60%. The negative electrode has an operating potential of 0.7 V or more with respect to the potential of metallic lithium.

13 Claims, 4 Drawing Sheets

(56) References Cited

U.S. PATENT DOCUMENTS

| | | | |
|---|---|---|---|
| 2015/0004493 A1 | 1/2015 | Kim | |
| 2015/0118540 A1 | 4/2015 | Fujiwara et al. | |
| 2015/0200388 A1 | 7/2015 | Yoshitomi | |
| 2015/0311493 A1 | 10/2015 | Abe et al. | |
| 2019/0173070 A1* | 6/2019 | Ono | H01M 10/0563 |

FOREIGN PATENT DOCUMENTS

| | | |
|---|---|---|
| JP | 2004-171999 | 6/2004 |
| JP | 2010-53245 | 3/2010 |
| JP | 2010-245028 | 10/2010 |
| JP | 2010-251215 | 11/2010 |
| JP | 2013-134858 | 7/2013 |
| JP | 2014-60118 | 4/2014 |
| JP | 2014-60123 | 4/2014 |
| JP | 2014-60125 | 4/2014 |
| JP | 2015-60719 | 3/2015 |
| JP | 2015-515721 | 5/2015 |
| WO | WO 2008/114727 A1 | 9/2008 |
| WO | WO 2016/068286 A1 | 5/2016 |

OTHER PUBLICATIONS

Written Opinion dated Feb. 6, 2018 in PCT/JP2017/046361 filed Dec. 25, 2017.
Extended European Search Report dated Jun. 19, 2020 in European Patent Application No. 17888890.5, 10 pages.

* cited by examiner

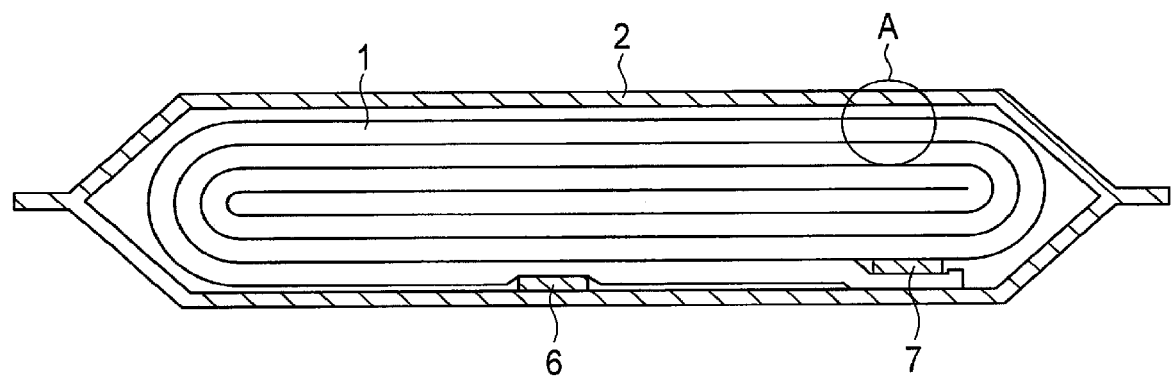
F I G. 1
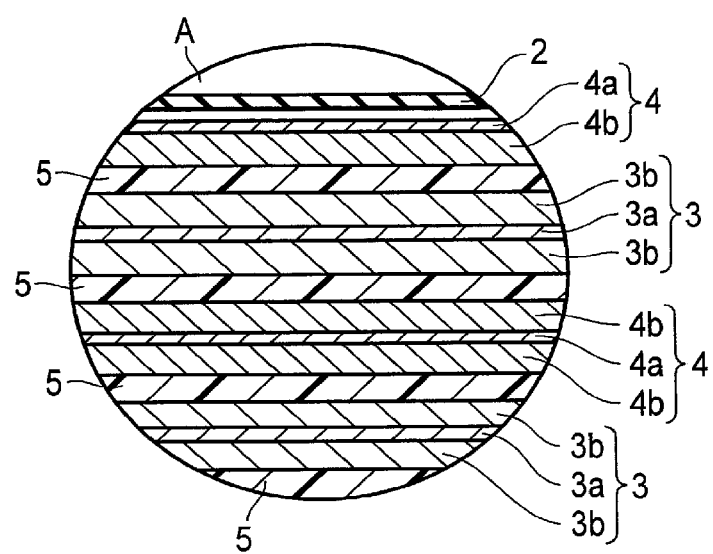
F I G. 2

NONAQUEOUS ELECTROLYTE BATTERY AND BATTERY PACK

CROSS-REFERENCE TO RELATED APPLICATION

This application is a Continuation Application of PCT Application No. PCT/JP2017/046361, filed Dec. 25, 2017 and based upon and claiming the benefit of priority from Japanese Patent Application No. 2016-250979, filed Dec. 26, 2016, the entire contents of all of which are incorporated herein by reference.

FIELD

The present disclosure relates to a nonaqueous electrolyte battery and a battery pack.

BACKGROUND

In order to improve the performance of nonaqueous electrolyte batteries such as lithium-ion batteries, a nonwoven fabric made by combining fibers having two types of fiber diameters, a stack where two types of nonwoven fabrics having different fiber diameters are stacked together, or the like, has been used as a separator. Adjustment of the thickness, air permeability, or vacancy of the separator has also been considered. Use of a separator made of a polyolefin film with adjusted tortuosity and vacancy is also being considered.

However, the resistance of the separators considered so far is still high, and there is a demand for decreasing the resistance even further. Increasing the vacancy of the separator in order to decrease the resistance thereof increases the rate of occurrence of an internal short circuit, thereby requiring the tackling of both the issue of the internal short circuit and the issue of the resistance.

BRIEF DESCRIPTION OF THE DRAWING(S)

FIG. 1 is a sectional view of a nonaqueous electrolyte battery of a first example according to a first embodiment;

FIG. 2 is an enlarged sectional view of a portion A of FIG. 1;

DETAILED DESCRIPTION

Figure 3:
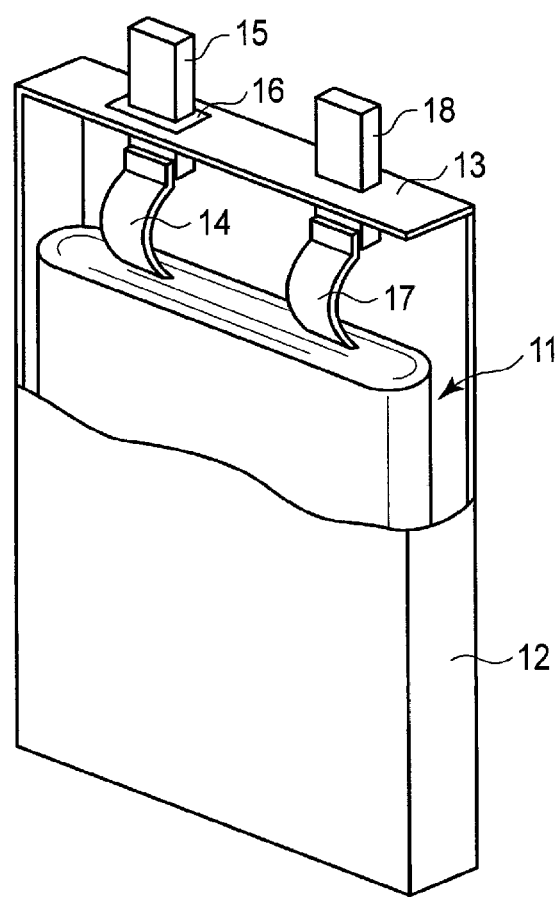
FIG. 3 is a partially cutaway perspective view of a nonaqueous electrolyte battery of a second example according to the first embodiment.

According to one embodiment, provided is a nonaqueous electrolyte battery that includes a positive electrode, a negative electrode, a separator, and a nonaqueous electrolyte. The separator is disposed between the positive electrode and the negative electrode. The separator includes a fiber-made nonwoven fabric having a tortuosity of 1.8 to 3 and a vacancy of 40% to 60%. The negative electrode has an operating potential of 0.7 V or more with respect to the potential of metallic lithium.

According to one embodiment, a battery pack is provided. The battery pack includes the nonaqueous electrolyte battery according to the embodiment.

The embodiments will be explained below with reference to the drawings. Structures common to all embodiments are represented by the same symbols and overlapping explanations will be omitted. Also, each drawing is a typical view for explaining the embodiments and for promoting the understanding of the embodiments. Though there are parts different from an actual device in shape, dimension and ratio, these structural designs may be properly changed taking the following explanations and known technologies into consideration.

First Embodiment

According to a first embodiment, there is provided a nonaqueous electrolyte battery that includes a positive electrode, a negative electrode, a separator disposed between the positive electrode and the negative electrode, and a nonaqueous electrolyte. The separator includes a fiber-made nonwoven fabric having a tortuosity of 1.8 to 3 and a vacancy of 40% to 60%. The negative electrode has an operating potential of 0.7 V or more with reference to the potential of metallic lithium.

The tortuosity of the separator is measured by the method described later, and is the ratio of the moving distance of ions relative to the thickness of the separator. The tortuosity does not necessarily correlate with the vacancy. Also, separators having the same tortuosity and vacancy have different porous structures if the types of the separators or the types of fiber differ. The present inventors have found that, when the fiber-made nonwoven fabric having a tortuosity of 1.8 to 3 and a vacancy of 40% to 60% is used as a separator, the internal short circuit (micro short circuit) is suppressed, whereby the capacity reduction due to self-discharge is suppressed, while the resistance of the separator is decreased, whereby the rate performance is improved. Since the separator made of the fiber-made nonwoven fabric with the above construction has a structure with more gaps between fibers as compared to a microporous polyolefin membrane, there is increase in the volume within which lithium ions can move, allowing for more lithium ions to move as result, and thus, the resistance of the separator decreases. Also, in this separator, since the lithium ion diffusivity is improved by an increase in gaps between fibers, a shielding rate is appropriate and the internal short circuit is less likely to occur.

If the vacancy of the fiber-made nonwoven fabric is less than 40%, the battery resistance increases. If the vacancy exceeds 60%, internal short circuit is apt to occur. Even if the vacancy of the fiber-made nonwoven fabric is from 40% to 60%, when the tortuosity is less than 1.8, there is little volume in the separator within which ions can move, causing the resistance to increase. In addition, even if the vacancy of the fiber-made nonwoven fabric is from 40% to 60%, when the tortuosity exceeds 3, while there is increase in the volume within which lithium ions can move, the gap(s) between fibers increases at the same time; as a result, the strength decreases, and a short circuit is apt to occur.

While this separator facilitates movement of lithium ions, many sparse portions are present, whereby shielding properties may not be sufficient. Since the negative electrode has an operating potential of 0.7 V (vs. Li/Li$^+$) or more with respect to the potential of metallic lithium, precipitation of lithium metal on the separator can be prevented, and accordingly, an internal short circuit due to precipitation of lithium metal can be avoided.

By having the fiber constituting the fiber-made nonwoven fabric be a fiber made of at least one material selected from the group consisting of cellulose, polyester, polyvinyl alcohol, polyamide, polytetrafluoroethylene, and vinylon, the porous structure of the separator can be made suitable for the movement of lithium ions, allowing for further reduction of the battery resistance. Preferred examples of the fiber are cellulose and polyester. In this context, cellulose includes synthetic cellulose and natural pulp.

While a fiber of one type of material or fibers of two or more types of materials may be used, the lithium ion diffusivity of the separator can be improved when the nonwoven fabric includes 30% to 100% by mass of cellulose fiber.

Setting the average fiber diameter of the fibers constituting the fiber-made nonwoven fabric to 20 μm or less maintains a favorable balance between the prevention of internal short circuit and the ion permeability. The lower limit of the average fiber diameter is preferably 0.3 μm.

The air permeability of the separator according to the Gurley method (JIS-P-8117, ISO5636-5:2003) may be in the range of 0.01 (sec/100 cc) to 1.0 (sec/100 cc). By setting the air permeability in this range, the resistance of the separator can be decreased to improve the rate performance. Also, a separator having a tortuosity and vacancy in a desired range becomes easy to obtain.

The density of the separator may be set in the range of $4 \times 10^5$ (g/m$^3$) to $8 \times 10^5$ (g/m$^3$). Thereby, a separator having a tortuosity and vacancy in a desired range becomes easy to obtain.

The basis weight of the separator may be set in the range of 7 (g/m$^2$) to 20 (g/m$^2$). Thereby, a separator having a tortuosity and vacancy in a desired range becomes easy to obtain.

The thickness of the separator may be in the range of 10 μm to 35 μm. If the thickness of the separator is thin, the rate of occurrence of internal short circuit may increase even when the tortuosity is from 1.8 to 3, and the vacancy is from 40% to 60%. Also, if the separator is thick, it is difficult to decrease the resistance of the separator by adjusting the tortuosity and the vacancy.

Next, the nonaqueous electrolyte battery according to the first embodiment will be described in more detail.

The negative electrode may include a negative electrode current collector and a negative electrode mixture layer (negative electrode active material containing layer) formed on the negative electrode current collector.

The negative electrode current collector may include on a surface thereof, a portion that does not support the negative electrode mixture layer. The portion can function as a negative electrode tab. Alternatively, the negative electrode may also further include a negative electrode tab independent from the negative electrode current collector.

The negative electrode mixture layer includes a negative electrode active material. The negative electrode mixture layer may further include an electro-conductive agent and a binder if needed.

The positive electrode may include a positive electrode current collector and a positive electrode mixture layer (positive electrode active material containing layer) formed on the positive electrode current collector.

The positive electrode current collector may include on a surface thereof, a portion that does not support the positive electrode mixture layer. The portion can function as a positive electrode tab. Alternatively, the positive electrode may also further include a positive electrode tab independent from the positive electrode current collector.

The positive electrode mixture layer includes a positive electrode active material. The positive electrode mixture layer may further include an electro-conductive agent and a binder, if needed.

The positive electrode and the negative electrode can structure an electrode group. For example, in the electrode group, the positive electrode mixture layer and the negative electrode mixture layer may face each other with a separator positioned therebetween. The structure of the electrode group is not particularly limited, and various structures may be implemented. For example, the electrode group may have a stacked structure. The electrode group having the stacked structure can be obtained by stacking, for example, plural of positive electrodes and negative electrodes with the separator sandwiched between the positive electrode mixture layer and the negative electrode mixture layer. Alternatively, the electrode group may have a wound structure, for example. The wound electrode group can be obtained, for example, by winding a positive electrode, a separator, and a negative electrode in a spiral.

The nonaqueous electrolyte battery may further include a negative electrode terminal and a positive electrode terminal. The negative electrode terminal can function as a conductor for electron transfer between the negative electrode and an external terminal, by electrically connecting a part of the negative electrode terminal to a part of the negative electrode. The negative electrode terminal may be connected to, for example, the negative electrode current collector, particularly the negative electrode tab. Similarly, the positive electrode terminal may function as a conductor for electron transfer between the positive electrode and an external circuit, by electrically connecting a part of the positive electrode terminal to a part of the positive electrode. The positive electrode terminal may be connected to, for example, the positive electrode current collector, particularly the positive electrode tab.

The nonaqueous electrolyte battery according to the first embodiment may further include a container member. The container member can house the electrode group and the nonaqueous electrolyte. The nonaqueous electrolyte may be held by the electrode group, inside the container member. A part of the positive electrode terminal and a part of the negative electrode terminal may extend out from the container member.

Hereinafter, the separator, the positive electrode, the negative electrode, the nonaqueous electrolyte, the positive electrode terminal, the negative electrode terminal, and the container member will be described.

[Separator]

The separator includes a fiber-made nonwoven fabric having a tortuosity of 1.8 to 3 and a vacancy of 40% to 60%.

The method of calculating the tortuosity is as follows. The fiber-made nonwoven fabric is subjected to measurement of pore diameter distribution and vacancy according to mercury porosimetry, measurement of gas adsorption-BET specific surface area, and measurement of air permeability according to perm porometry. The tortuosity is calculated by integrating the obtained measurement results. Specifically, the tortuosity (degree of curvature) $l_e/l_d$ is determined based on the following formula (A):

$$\frac{l_e}{l_d} = \sqrt{\frac{\varepsilon}{2k} \left( \frac{V_P}{S_{BET}} \right)} \tag{A}$$

where $l_d$ denotes the thickness of a sample, $l_e$ denotes the pore path length in the thickness direction of the sample, $V_P$ denotes the pore specific volume (cm³/g), $S_{BET}$ denotes the specific surface area according to the BET method of the sample, e denotes the vacancy, and k denotes Darcy's air permeability constant. Separators extracted from the same battery are used as the samples for measuring these parameters.

1. The method for extracting a separator from a battery is as follows.

First, a nonaqueous electrolyte battery is disassembled. The disassembly of the battery can be performed, for example, under an inert atmosphere such as one of argon. Then, an electrode group is removed from the disassembled nonaqueous electrolyte battery. Using tweezers or the like, the separator is removed from the aforementioned electrode group. The removed separator is washed with methyl ethyl carbonate to remove Li salt in the separator. The separator is dried after being washed.

2. The separator extracted in the procedure of 1 is cut out into a size of 100 mm long and 100 mm wide, and used as a sample.

3. The method of measuring the specific surface area $S_{BET}$ of the sample by the BET method is as follows.

The mass of the sample cut into the size described in 2 is measured, to examine the mass of the sample. For example, about 0.4 g of the sample is placed in a glass cell, and vacuum degassed at room temperature for about 24 hours as a pretreatment. Thereafter, the sample is cooled with liquid nitrogen. Then, an adsorption isotherm is measured using, for example, BELSORP-max manufactured by BEL Japan, Inc. as a measuring apparatus, to determine the specific surface area according to the BET method. For example, nitrogen or krypton gas can be used as the adsorption gas.

4. The method of measuring the thickness $l_d$ of the sample is as follows.

The thickness of the separator can be measured by the following procedure. First, the separator subjected to the process described in 1 is cut into a length of 500 mm. The separator having a length of 500 mm is folded back on itself in ten-fold in such a manner that the fold creases are perpendicular to the length direction, and the thickness thereof is measured using an external micrometer (spindle diameter 6.35 mm, measuring length 25 mm or less) specified in JIS B7502 (ISO3611:1978). The quotient obtained by dividing this obtained value by 10 is determined as the thickness of the separator.

The method of measuring the vacancy of the separator is as follows.

The measurement sample is fed into a measurement analyzer. Examples of the measuring device include Auto-Pore IV 9510 manufactured by Micromeritics Instruments Corporation. When performing the measurement using this device, the measurement sample subjected to the process described in 1 is cut into a size of about 50 mm to 100 mm square, and the cut piece is folded and inserted into the sample cell of this device, so that the pore diameter distribution can be measured.

The pore specific volume $V_P$(cm³/g) is calculated from the pore diameter distribution measured under such conditions, and the vacancy ε(%) is calculated by the following formula (B) based on the sample mass W(g) and the sample volume V(cm³) (length×width×thickness).

$$\varepsilon = V_p \times W \times 100 / V \quad \text{(B)}$$

$$\varepsilon = \frac{100 V_p W}{V} \quad \text{(B)}$$

where the sample volume V(cm³) is calculated from the longitudinal dimension (cm), the lateral dimension (cm), and the thickness (cm) of the sample.

The method of measuring by the perm porometry is as follows. The perm porometry is a penetration pore evaluation method by the bubble-point method (JIS K3832, ASTM F316-86). The bubble-point method is a method of applying air pressure to a porous sample wetted with liquid, gradually increasing the pressure, and determining the maximum pore diameter (bubble-point diameter) from the pressure (bubble point) at the moment liquid is extruded. By applying and expanding the bubble-point method to measure the relationship between air pressure and air flow rate, the pore diameter distribution of through-holes can be determined. Whereas the mercury porosimetry grasps the openings of through-holes and semi-through-holes, the perm porometry method can grasp the neck portions of the through-holes and the semi-through-holes that dominate the permeability of liquid. Therefore, the pore diameter distribution of the through-holes obtained by the perm porometry method is suitable for calculating the tortuosity.

The method for measuring Darcy's air permeability constant k is as follows. Darcy's air permeability constant k (unit: Darcy) is an index of air permeability and is defined by the following formula (C).

$$k = 8FTV / [\pi D^2 (P^2 - 1)] \quad \text{(C)}$$

$$k = \frac{8FTV}{\pi D^2 (P^2 - 1)} \quad \text{(C)}$$

Here, F denotes a flow rate (m·s⁻¹). T denotes the thickness of the sample, which is represented by $l_d$. V denotes viscosity (Pa·S), D denotes the diameter of the sample (maximum pore diameter of the sample measured by the perm porometry), and P denotes pressure (Pa). The greater the Darcy's permeability constant, the greater the permeability.

The method of measuring the average fiber diameter of the fibers that constitute the nonwoven fabric is as follows. The average fiber diameter is obtained by cutting out a 1-cm-square test piece from each of the 20-cm-wide areas of the sample, excluding each of the 10-cm ends of the sample. For each test piece, the diameter of the fiber is measured at 30 points using a microscope to calculate the average value of the measured values (rounded off to one decimal place in micrometer units), and the calculated average value is determined as the fiber diameter of the fiber included in the sample.

The tortuosity and the vacancy of the separator may be adjusted, for example, by the density, basis weight (mass per unit area), air permeability, fiber length, etc., of the nonwoven fabric made of cellulose fiber. The cellulose fiber, as described here, includes fiber from natural pulp and synthetic cellulose fiber. A separator having a tortuosity and a vacancy of a target value is more easily obtained by using fiber from natural pulp. Also, the relationship between the tortuosity and the vacancy is not such that the tortuosity of from 1.8 to 3 is satisfied as long as the vacancy is from 40% to 60%. Both the tortuosity and the vacancy need to be adjusted to a desired range. The tortuosity of the separator can be set in a desired range by, for example, adjusting the density and the basis weight of the non-woven fabric.

[Positive Electrode]

[Positive Electrode Active Material]

As the positive electrode active material, for example, used is an oxide into which lithium may be inserted and extracted from. Examples of such oxides include manganese dioxide ($MnO_2$), iron oxide, copper oxide, nickel oxide, lithium-manganese composite oxide (e.g., $Li_xMn_2O_4$ and/or $Li_xMnO_2$, where $0<x\le1$), lithium-nickel composite oxide (e.g., $Li_xNiO_2$, where $0<x\le1$), lithium-cobalt composite oxide (e.g., $Li_xCoO_2$, where $0<x\le1$), lithium-nickel-cobalt composite oxide (e.g., $Li_xNi_{1-y}Co_yO_2$, where $0<x\le1$, $0<y<1$), lithium-manganese-cobalt composite oxide (e.g., $Li_xMn_yCo_{1-y}O_2$, where $0<x\le1$, $0<y<1$), lithium-nickel-cobalt-aluminum composite oxide (e.g., $Li_xNi_{1-y-z}Co_yAl_zO_2$, where $0<x\le1$, $0<1-y-z<1$, $0<y<1$, $0<z<1$), lithium-manganese-nickel composite oxide having a spinel structure (e.g., $Li_xMn_{2-y}Ni_yO_4$, where $0<x\le1$, $0<2-y<2$, $0<y\le1$), lithium-phosphorus oxide having an olivine structure (e.g., $Li_xFePO_4$, $Li_xFe_{1-y}Mn_yPO_4$, where $0<x\le1$, $0\le y\le1$), iron sulfate (e.g., $Fe_2(SO_4)_3$), and vanadium oxide (e.g., $V_2O_5$), lithium-nickel-cobalt-manganese composite oxide (may have a composition represented by the general formula of $Li_{1-x}Ni_{1-a-b-c}Co_aMn_bM1_cO_2$, for example. M1 is at least one selected from the group consisting of Mg, Al, Si, Ti, Zn, Zr, Ca, W, Nb and Sn. Each index is in the range of $-0.2\le x\le0.5$, $0<a<0.4$, $0<b<0.5$, $0\le c<0.1$.). For the positive electrode active material, any one of the aforementioned oxides may be used alone, or two or more may be used in combination.

[Electro-Conductive Agent]

The electro-conductive agent is used to increase current collecting performance, as needed. Examples of the electro-conductive agent include carbon materials such as acetylene black, carbon black, graphite, carbon fiber, carbon nanotube, or the like. The species of electro-conductive agent to be used may be one specie, or two species or more.

[Binder]

The binder is used to bind the active material, electro-conductive agent, and positive electrode current collector, as needed. Examples of the binder include polytetrafluoroethylene (PTFE), polyvinylidene fluoride (PVdF), and fluorine rubber. The species of binder to be used may be one specie, or two species or more.

In the positive electrode active material containing layer, the content of active material, electro-conducting agent, and binder is preferably 80% by mass to 97% by mass, 2% by mass to 18% by mass, and 1% by mass to 17% by mass, respectively.

When the content of electro-conductive agent is 3% or more by mass, the above described effects can be attained. When the content of electro-conductive agent is 18% or less by mass, decomposition of the nonaqueous electrolyte that occurs at the surface of the electro conductive agent during storage at high temperature can be suppressed.

When the content of binder is 2% or more by mass, sufficient positive electrode strength can be obtained. When the content of binder is 17% or less by mass, increase in internal resistance can be prevented.

[Positive Electrode Current Collector]

The positive electrode current collector is preferably an aluminum foil or aluminum alloy foil including one or more element selected from the group consisting of Mg, Ti, Zn, Mn, Fe, Cu, and Si.

The positive electrode can be produced, for example, by suspending the positive electrode active material, binder, and electro-conductive agent in an appropriate solvent to prepare a slurry, applying the slurry onto the surface(s) of the positive electrode current collector, and subjecting to pressing after forming the positive electrode active material containing layer by drying. Examples of the solvent include N-methyl pyrrolidone. The positive electrode may alternatively be produced by, forming the positive electrode active material, binder, and electro-conductive agent in pellet shape to be the positive electrode active material containing layer, and arranging the pellets onto the positive electrode current collector.

[Negative Electrode]

The negative electrode includes a negative electrode current collector and a negative electrode active material containing layer. The negative electrode active material containing layer is provided on both sides of the negative electrode current collector. However, in a portion of the electrode group located at the outermost periphery, the negative electrode active material containing layer may be formed only on one side of the negative electrode current collector, as illustrated in, for example, FIG. 2. The negative electrode active material containing layer includes a negative electrode active material, and optionally includes an electro-conductive agent and a binder.

[Negative Electrode Active Material]

The negative electrode desirably has an operating potential of 0.7 V (vs. $Li/Li^+$) or more with respect to the potential of metallic lithium. The upper limit of the operating potential can be set to 3V (vs. $Li/Li^+$). The operating potential of the negative electrode is a potential at which insertion-extraction reaction of lithium or lithium ions occur in the negative electrode.

An example of a negative electrode active material capable of attaining such an operating potential is lithium titanate (e.g., $Li_{4+x}Ti_5O_{12}$, where $0\le x\le3$) having a spinel structure. By using lithium titanate having a spinel structure, precipitation of dendritic lithium on the negative electrode can be prevented.

Lithium titanate having a spinel structure may be used alone as the negative electrode active material; however, other active materials may be included, as well. Examples of other active materials include titanium-containing oxides such as titanium oxide having a monoclinic structure (e.g., $TiO_2(B)$), titanium oxide having an anatase structure ($Tio_2$), orthorhombic titanium-containing oxide, monoclinic niobium titanium composite oxide, and lithium titanate having a ramsdellite structure (e.g., $Li_{2+x}Ti_3O_7$, where $0\le x\le3$). Titanium oxide (e.g., $TiO_2$) may become lithium-titanium oxide due to the insertion of lithium during charge and discharge of the battery. Examples of the orthorhombic titanium-containing oxide include a compound represented by the general formula $Li_{2+w}Na_{2-x}M1_yTi_{6-z}M2_zO_{14+\delta}$ where M1 is Cs and/or K and M2 includes at least one of Zr, Sn, V, Nb, Ta, Mo, W, Fe, Co, Mn, and Al, and $0\le w\le4$, $0\le x\le2$, $0\le y\le2$, $0\le z\le6$, $-0.5\le\delta\le0.5$. Examples of the monoclinic niobium titanium-containing oxide include a compound represented by the general formula $Li_xTi_{1-y}M3_yNb_{2-z}M4_2O_{7+\delta}$, where M3 is at least one selected from the group consisting of Zr, Si, Sn, Fe, Co, Mn, and Ni, and M4 is at least one selected from the group consisting of V, Nb, Ta, Mo, W, and Bi, and $0\le x\le5$, $0\le y<1$, $0\le z<2$, $-0.3\le\delta\le0.3$.

The operating potential is determined as follows. An electrode and a lithium metal foil are faced opposing each other, and a separator is disposed therebetween. A lithium metal foil, different from the one facing the electrode, is disposed in vicinity of the electrode. Lithium ions are moved between the electrode and the lithium metal foil faced opposing the electrode. Thereby, charge and discharge are performed three times. The charge and discharge conditions are as follows. The electrode being measured is subjected to a "constant current, constant voltage charge" in the following manner. Starting from an OCV (open-circuit voltage) of about 3 V, a reduction current is applied to the electrode being measured to perform constant current charge up to a full charge voltage at 1 C. Thereafter, constant voltage charge is performed at 1.0 V, and the charging is terminated when the current value converges to $\frac{1}{20}$C. Then, after a 10-minute rest, discharge is performed to 3 V at 1 C. The value obtained by dividing the discharge energy (Wh) at that time by the amount of electricity discharged is taken as the operating potential of the negative electrode. A solution obtained by dissolving 1 mol/L of lithium hexafluorophosphate in a solvent of ethylene carbonate and methyl ethyl carbonate at a volume ratio of 1:1, is used as an electrolyte solution. The fiber-made nonwoven fabric having a tortuosity of 1.8 to 3 and a vacancy of 40% to 60% according to the present embodiment may be used as the separator; however, the separator is not limited thereto. For example, a nonwoven fabric made of synthetic resin, a porous film made of polyolefin (such as one made of polyethylene or of polypropylene) and a cellulose-based separator are used. Also, a separator formed by combining these materials, e.g., a separator made of a porous film comprising polyolefin and cellulose can be used.

When the negative electrode active material includes an active material other than lithium titanate having a spinel structure, the proportion of the mass of lithium titanate having a spinel structure to the total mass of the negative electrode active material may be 10% by mass or greater and less than 100% by mass.

The electro-conductive agent is used to increase current collecting performance, as needed. Examples of the electro-conductive agent include carbon materials such as acetylene black, carbon black, graphite, and the like. The species of electro-conductive agent to be used may be one specie, or two species or more.

The binder is used to bind the active material, electro-conductive agent, and negative electrode current collector, as needed. Examples of the binder include polytetrafluoroethylene (PTFE), polyvinylidene fluoride (PVdF), and fluorine rubber. The species of binder to be used may be one specie, or two species or more.

In the negative electrode active material containing layer, the content of negative electrode active material, electro-conducting agent, and binder is preferably 70% by mass to 98% by mass, 1% by mass to 28% by mass, and 1% by mass to 28% by mass, respectively. When the content of electro-conductive agent is 2% or more by mass, current collecting performance of the negative electrode active material containing layer can be improved. When the content of binder 2% or more by mass, sufficient binding property can be obtained between the negative electrode active material containing layer and the current collector. Therefore, cycle performance can be improved. On the other hand, from the viewpoint of increasing the capacity, the content for each of the electro-conductive agent and the binder is preferably 28 wt % or lower.

[Negative Electrode Current Collector]

The negative electrode current collector is preferably an aluminum foil or aluminum alloy foil including one or more element selected from the group consisting of Mg, Ti, Zn, Mn, Fe, Cu, and Si.

The negative electrode can be produced, for example, by suspending the negative electrode active material, binder, and electro-conductive agent in an appropriate solvent to prepare a slurry, applying the slurry onto the surface(s) of the negative electrode current collector, and subjecting to pressing after forming the negative electrode active material containing layer by drying. Examples of the solvent include N-methyl pyrrolidone. The negative electrode may alternatively be produced by, forming the negative electrode active material and binder, as well as the electro-conductive agent mixed-in as necessary, in pellet shape to be the negative electrode active material containing layer, and arranging the pellets onto the negative electrode current collector.

[Nonaqueous Electrolyte]

As the nonaqueous electrolyte, a liquid nonaqueous electrolyte may be used. The liquid nonaqueous electrolyte is prepared, for example, by dissolving an electrolyte in an organic solvent. The concentration of the electrolyte in the nonaqueous electrolyte is preferably 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bis-trifluoromethylsulfonylimide [$LiN(CF_3SO_2)_2$], and mixtures thereof. The species of electrolyte to be used may be one specie, or two species or more. The electrolyte is preferably difficult to oxidize, even at a high potential, and $LiPF_6$ is most preferable.

Examples of the organic solvent include propylene carbonate (PC), ethylene carbonate (EC), 1,2-dimethoxy ethane (DME), γ-butyrolactone (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), and methyethyl carbonate (MEC). These organic solvents may be used alone or as a mixed solvent.

[Negative Electrode Terminal and Positive Electrode Terminal]

The negative electrode terminal and the positive electrode terminal are preferably made of a material having high electrical conductivity. When the terminals are connected to a current collector, in order to reduce contact resistance, these terminals are preferably made of the same material as that of the current collector.

[Container Member]

As the container member, a metal container or a laminate film container may be used, for example; however, there is no particular limitation.

By using a metal container as the container member, a nonaqueous electrolyte battery having excellent impact resistance and long-term reliability can be realized. By using a laminate film container as the container member, a nonaqueous electrolyte battery having excellent corrosion resistance can be realized, while simultaneously allowing weight reduction of the nonaqueous electrolyte battery.

A metal container having a wall thickness within a range of, for example, 0.2 mm to 5 mm may be used. The metal container more preferably has a wall thickness of 0.5 mm or less.

The metal container preferably includes at least one metal element selected from the group consisting of Fe, Ni, Cu, Sn, and Al. The metal container may be made of, for example, aluminum, an aluminum alloy, or the like. The aluminum alloy is preferably an alloy including elements such as magnesium, zinc, and silicon. When the alloy includes transition metals such as iron, copper, nickel, and chromium, the amount thereof is preferably 1% by mass or less. Thereby, long-term reliability and impact resistance under a high temperature environment can be dramatically improved.

A laminate film container having a film thickness within a range of, for example, 0.1 mm to 2 mm may be used. The film thickness of the laminate film is more preferably 0.2 mm or less.

The laminate film is made of, for example, a multilayer film including a metal layer and resin layers sandwiching the metal layer. The metal layer preferably includes at least one metal selected from the group consisting of Fe, Ni, Cu, Sn, and Al. The metal layer is preferably made of an aluminum foil or an aluminum alloy foil in order to lighten weight. As the resin layer, a polymeric material such as polypropylene (PP), polyethylene (PE), nylon, or polyethylene terephthalate (PET) may be used. The laminate film can be molded into the shape of the container member by thermally sealing the laminate film.

Examples of the shape of the container member include a flat form (thin form), an angular form, a cylinder form, a coin form, and a button form. The container member may be of various sizes depending on the application thereof. For example, when the nonaqueous electrolyte battery according to the first embodiment is used in the application of a mobile electronic device, the container member may be of small size in accordance with the size of electronic device to be installed in. Alternatively, for a nonaqueous electrolyte battery to be loaded onto two-wheeled or four-wheeled vehicles or the like, the container may be a container for a large-sized battery.

Next, examples of a nonaqueous electrolyte battery according to the embodiment will be described in more detail with reference to the drawings.

An example of a battery according to the embodiment will be described with reference to FIGS. 1 and 2. As shown in FIG. 1, a flat nonaqueous electrolyte secondary battery is provided with a flat shaped wound electrode group 1, a container member 2, a positive electrode terminal 7, a negative electrode terminal 6, and a nonaqueous electrolyte. The container member 2 is a bag-form container member made of laminate film. The wound electrode group 1 is housed in the container member 2. As shown in FIG. 2, the wound electrode group 1 includes a positive electrode 3, a negative electrode 4, and a separator 5, and the electrode group 1 is formed by stacking the negative electrode 4, the separator 5, the positive electrode 3, and the separator 5 in this order from the outside to obtain a stack, which is spirally wound and subjected to press molding.

The positive electrode 3 includes a positive electrode current collector 3a and a positive electrode active material containing layer 3b. The positive electrode active material containing layer 3b contains a positive electrode active material. The positive electrode active material containing layer 3b is formed on both of reverse surfaces of the positive electrode current collector 3a. The negative electrode 4 includes a negative electrode current collector 4a and a negative electrode active material containing layer 4b. The negative electrode active material containing layer 4b contains a negative electrode active material. In the negative electrode 4, at the outermost layer, the negative electrode active material containing layer 4b is formed only on one surface on the inner surface side of the negative electrode current collector 4a, and in the other portions, the negative electrode active material containing layer 4b is formed on both of reverse surfaces of the negative electrode current collector 4a.

As shown in FIG. 2, the belt-form positive electrode terminal 7 is connected to the positive electrode current collector 3a of the positive electrode 3, in vicinity of the outer peripheral end of the wound electrode group 1. Further, the belt-form negative electrode terminal 6 is connected to the negative electrode current collector 4a of the negative electrode 4 at the outermost layer. The positive electrode terminal 7 and the negative electrode terminal 6 are extended to the outside through an opening of the container member 2. A nonaqueous electrolyte solution is further put into the container member 2 as a nonaqueous electrolyte. The openings of the container member 2 are heat-sealed with the positive electrode terminal 7 and the negative electrode terminal 6 interposed therebetween, whereby the wound electrode group 1 and the nonaqueous electrolyte are sealed.

The battery according to the embodiment is not limited to the configuration shown in FIG. 1 and FIG. 2 described above, but may be configured as shown in FIGS. 3 and 4, for example. The same members as those in FIGS. 1 and 2 are denoted by the same reference numerals, and description thereof is omitted.

In an angular nonaqueous electrolyte battery shown in FIG. 3, a wound electrode group 11 is housed in a bottomed rectangular tubular container (container member) 12 made of metal. The nonaqueous electrolyte solution (liquid non-aqueous electrolyte) is poured in from the opening of the container 12, for example, and is housed inside the container 12. By welding a rectangular lid 13 to the opening of the container 12, the wound electrode group 11 and the non-aqueous electrolyte solution are sealed inside the container member. The flat wound electrode group 11 is formed by winding spirally a stack obtained by stacking the negative electrode, separator, positive electrode, and separator in this order, and performing press molding.

One end of a negative electrode tab 14 is electrically connected to the negative electrode current collector and the other end thereof is electrically connected to a negative electrode terminal 15. The negative electrode terminal 15 is fixed to the rectangular lid 13 by a hermetic seal with a glass material 16 interposed as an insulating member. One end of a positive electrode tab 17 is electrically connected to the positive electrode current collector and the other end is electrically connected to a positive electrode terminal 18 fixed to the rectangular lid 13.

The negative electrode tab 14 is made of a material such as aluminum or an aluminum alloy containing elements such as Mg, Ti, Zn, Mn, Fe, Cu, and Si, and the like. The negative electrode tab 14 is preferably formed of a similar material to that of the negative electrode current collector so as to reduce the contact resistance with the negative electrode current collector.

The positive electrode tab 17 is made of a material such as aluminum or an aluminum alloy containing elements such as Mg, Ti, Zn, Mn, Fe, Cu, and Si, and the like. The positive electrode tab 17 is preferably formed of a similar material to that of the positive electrode current collector so as to reduce the contact resistance with the positive electrode current collector.

In the illustrated nonaqueous electrolyte battery, the wound electrode group in which the separator is wound together with the positive electrode and the negative electrode has been used, but there may be used a stacked electrode group in which a separator is folded in zigzag and positive electrode(s) and negative electrode(s) are alternately arranged at the folded portions.

The nonaqueous electrolyte battery according to the first embodiment described above includes a separator including a fiber-made nonwoven fabric having a tortuosity of 1.8 to 3 and a vacancy of 40% to 60%. Therefore, there can be achieved a nonaqueous electrolyte battery in which there is little capacity reduction due to self-discharge caused by an internal short circuit and which exhibits excellent rate performance.

Second Embodiment

According to a second embodiment, a battery pack is provided. This battery pack includes the nonaqueous electrolyte battery according to the first embodiment.

The battery pack according to the second embodiment may include plural nonaqueous electrolyte batteries. The plural nonaqueous electrolyte batteries may be electrically connected in series or electrically connected in parallel. Alternatively, plural nonaqueous electrolyte batteries may be connected in a combination of series and parallel.

For example, the battery pack according to the second embodiment may be provided with, for example, five or six nonaqueous electrolyte batteries according to the first embodiment. These nonaqueous electrolyte batteries may be connected in series. Further, the nonaqueous electrolyte batteries connected in series may structure a battery module. That is, the battery pack according to the second embodiment may also include a battery module.

The battery pack according to the second embodiment may include plural battery modules. The plural battery modules may be connected in series, in parallel, or in combination of series and parallel.

Hereinafter, an example of a battery pack according to the second embodiment will be described with reference to FIGS. 4 and 5.

Figure 4:
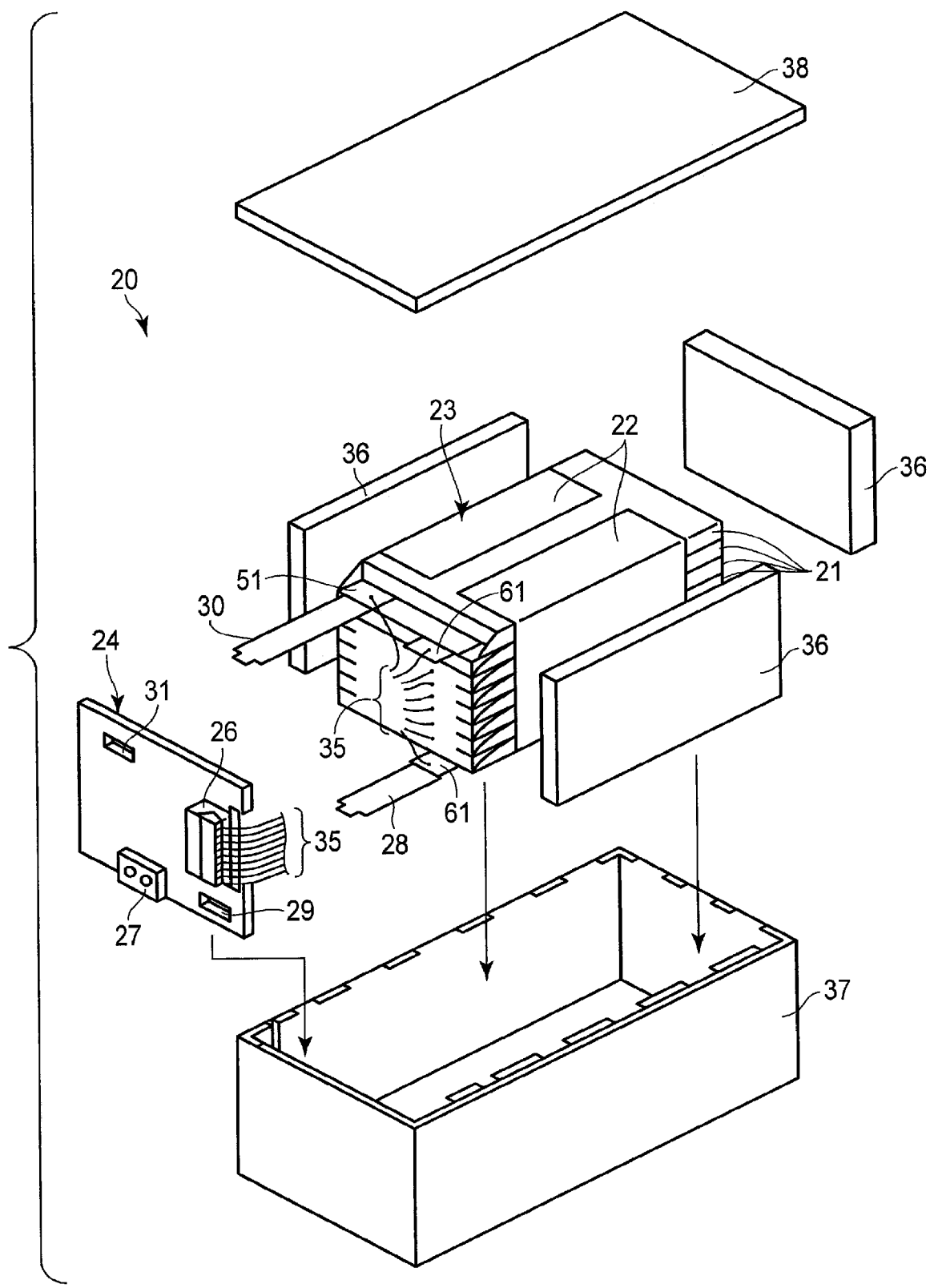
FIG. 4 is an exploded perspective view of an example of a battery pack according to a second embodiment.

FIG. 4 is an exploded perspective view of an example of the battery pack according to the second embodiment. FIG. 5 is a block diagram showing an electric circuit of the battery pack shown in FIG. 4.

Figure 5:
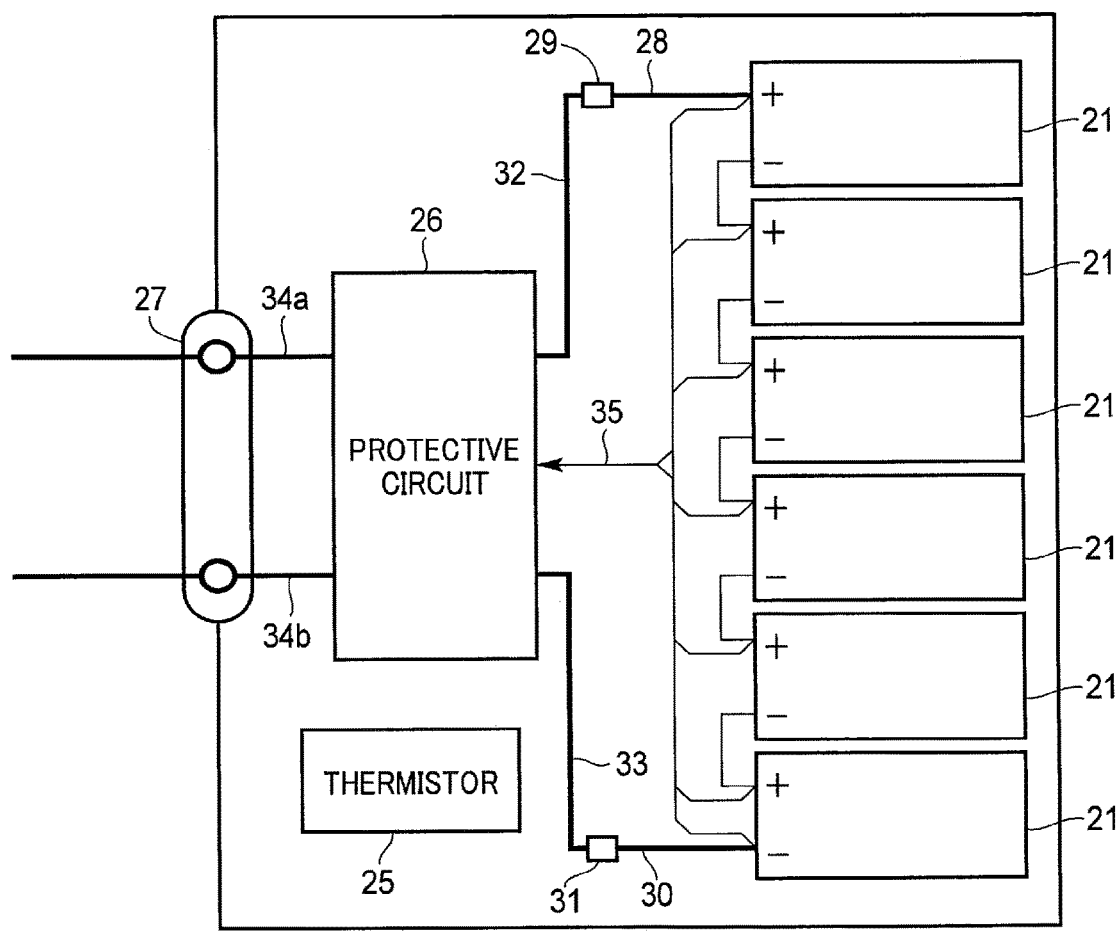
FIG. 5 is a block diagram showing an electric circuit of the battery pack shown in FIG. 4.

The battery pack 20 shown in FIGS. 4 and 5 includes plural single-batteries 21. The single-battery 21 may be the exemplar flat nonaqueous electrolyte battery according to the first embodiment described with reference to FIG. 1.

The plural single-batteries 21 are stacked so that externally extending negative electrode terminals 51 and positive electrode terminals 61 are aligned in the same direction and are fastened with an adhesive tape 22 to structure a battery module 23. These single-batteries 21 are electrically connected in series to each other as shown in FIG. 5.

A printed wiring board 24 is disposed facing the side surface from which the negative electrode terminals 51 and the positive electrode terminals 61 of the single-batteries 21 extend. As shown in FIG. 5, the printed wiring board 24 is mounted with a thermistor 25, a protective circuit 26, and an energizing terminal 27 to external equipment. Note that an insulating plate (not shown) is attached to the printed wiring board 24 on the surface facing the battery module 23 so as to avoid unnecessary connection with the wiring of the battery module 23.

A positive electrode side lead 28 is connected to the positive electrode terminal 61 located lowermost in the battery module 23, and a distal end thereof is inserted into a positive electrode side connector 29 of the printed wiring board 24 and electrically connected thereto. A negative electrode side lead 30 is connected to the negative electrode terminal 51 located uppermost in the battery module 23, and a distal end thereof is inserted into the negative electrode side connector 31 of the printed wiring board 24 and electrically connected thereto. These connectors 29 and 31 are connected to the protective circuit 26 through wiring 32 and wiring 33 formed on the printed wiring board 24.

The thermistor 25 detects the temperature of the single-batteries 21, and the detection signal is transmitted to the protective circuit 26. Under a predetermined condition, the protective circuit 26 can shut off a plus-side wiring 34a and a minus-side wiring 34b between the protective circuit 26 and the energizing terminal 27 to external equipment. An example of the predetermined condition is, for example, when the temperature detected by the thermistor 25 becomes a predetermined temperature or higher. Further, another example of the predetermined condition is, for example, when overcharge, over-discharge, overcurrent, or the like of the single-battery 21 is detected. Detection of this overcharge or the like is performed for each of the individual single-batteries 21 or the entire battery module 23. In the case of detecting each single-battery 21, a battery voltage may be detected, or a positive electrode potential or a negative electrode potential may be detected. In the latter case, a lithium electrode used as a reference electrode is inserted into each single-battery 21. In the case of the battery pack 20 of FIG. 4 and FIG. 5, wiring 35 for voltage detection is connected to each of the single-batteries 21. Detection signals are transmitted to the protective circuit 26 through the wiring 35.

Protective sheets 36 made of rubber or resin are respectively arranged on three side surfaces of the battery module 23 excluding the side surface from which the positive electrode terminal 61 and the negative electrode terminal 51 protrude.

The battery module 23 is housed in a housing container 37 together with each protective sheet 36 and the printed wiring board 24. That is, the protective sheets 36 are disposed in the housing container 37 respectively on both inner side surfaces in a long-side direction and an inner side surface in a short-side direction, and the printed wiring board 24 is disposed on the inner side surface at the opposite side in the short-side direction. The battery module 23 is located in a space surrounded by the protective sheets 36 and the printed wiring board 24. A lid 38 is attached to the upper surface of the housing container 37.

For fixing the battery module 23, a thermal shrinkage tape may be used in place of an adhesive tape 22. In this case, after the protective sheets are disposed on each side surface of the battery module and a thermal shrinkage tape is wound, the thermal shrinkage tape is thermally shrunk, to bind the battery module.

In FIGS. 4 and 5, shown is a form where the single-batteries 21 are connected in series, but the single-batteries 21 may be connected in parallel in order to increase the battery capacity. Further, the assembled battery packs may also be connected in series and/or parallel.

Moreover, the mode of the battery pack according to the second embodiment is appropriately changed depending on the application. A preferable application of the battery pack according to the second embodiment is one where favorable cycle performance is desired along with favorable large current performance. Specific examples of the applications include that for a power source of a digital camera, and for onboard use such as for a two-wheeled or four-wheeled hybrid electric vehicle, a two-wheeled or four-wheeled electric vehicle, and a power-assisted bicycle. In particular, the battery pack according to the second embodiment is favorable for onboard use.

Since the battery pack according to the second embodiment is provided with the nonaqueous electrolyte battery according to the first embodiment, capacity reduction due to self-discharge caused by internal short-circuit is diminished, while rate performances are excellent.

EXAMPLES

Hereinafter, the above embodiments will be described in more detail based on examples.

Example 1

In Example 1, a nonaqueous electrolyte battery of Example 1 was produced following the procedure described below.

<Production of Positive Electrode>

$LiNi_{0.33}Co_{0.33}Mn_{0.33}O_2$ particles as a positive electrode active material, carbon black as an electro-conductive agent, and polyvinylidene fluoride as a binder were prepared. The prepared materials were mixed at a mass ratio of 90:5:5 to obtain a mixture.

Next, the resulting mixture was dispersed in n-methyl pyrrolidone (NMP) solvent to prepare a slurry. The resulting slurry was applied to a 20 μm-thick aluminum foil and dried. The dried coating was then pressed to obtain a positive electrode.

<Production of Negative Electrode>

$Li_4Ti_5O_{12}$ as a negative electrode active material, carbon black as an electro-conductive agent, and polyvinylidene fluoride as a binder were prepared. The prepared materials were mixed at a mass ratio of 90:5:5 to obtain a mixture.

Next, the resulting mixture was dispersed in n-methyl pyrrolidone (NMP) solvent to prepare a slurry. The resulting slurry was applied to a 20 μm-thick aluminum foil and dried. The dried coating was then pressed to obtain a negative electrode. The negative electrode had an operating potential of 1.0 V to 2.0 V (vs. $Li/Li^+$) with respect to the potential of metallic lithium.

<Production of Separator>

A nonwoven fabric made of cellulose fiber constituted from natural pulp having a thickness, tortuosity, vacancy, Gurley value, average fiber diameter, density, and basis weight in the range shown in Table 1 below was prepared as a separator.

<Assembly of Cell>

The positive electrode produced as described above, the separator, the negative electrode produced as described above, and another of the separator, were stacked in this order. The resulting stack was spirally wound so that the negative electrode was positioned at the outermost periphery, to prepare an electrode group. The resulting electrode group was pressed to obtain a flat electrode group. The flat electrode group was inserted into a can-shaped container (exterior can) made of aluminum having a thickness of 0.3 mm, and sealed with a lid (sealing plate). In this manner, a flat nonaqueous electrolyte secondary battery having a thickness of 5 mm, a width of 30 mm, a height of 25 mm, and a mass of 10 g was produced. The rated capacity of the battery was 250 mAh.

<Preparation of Nonaqueous Electrolyte>

Ethylene carbonate (EC) and ethyl methyl carbonate (EMC) were mixed at a volume ratio of 1:2 to prepare a mixed solvent. Lithium hexafluorophosphate ($LiPF_6$) was dissolved in this mixed solvent at a concentration of 1 mol/L to prepare a nonaqueous electrolyte.

<Production of Battery>

The nonaqueous electrolyte was put into the exterior can containing the electrode group obtained as described above, through an inlet provided on the surface of the exterior can. Then, the inlet was sealed, and thereby a nonaqueous electrolyte battery was produced.

Examples 2 to 8 and Comparative Examples 1 to 5

Nonaqueous electrolyte batteries were produced in the same manner as in Example 1 except that nonwoven fabrics having a thickness, tortuosity, vacancy, type of fiber, Gurley value, average fiber diameter, density, and basis weight in the range shown in Table 1 below were used as a separator.

Example 9

A nonaqueous electrolyte battery was produced in the same manner as in Example 1 except that a negative electrode active material having the composition shown in Table 3 below was used as the negative electrode active material. The negative electrode had an operating potential of 0.8 V to 2.0 V (vs. $Li/Li^+$) with respect to the potential of metallic lithium.

Example 10

A nonaqueous electrolyte battery was produced in the same manner as in Example 1 except that a negative electrode active material having the composition shown in Table 3 below was used as the negative electrode active material. The negative electrode had an operating potential of 0.8 V to 2.0 V (vs. $Li/Li^+$) with respect to the potential of metallic lithium.

Example 11

A nonaqueous electrolyte battery was produced in the same manner as in Example 1 except that a negative electrode active material having the composition shown in Table 3 below was used as the negative electrode active material. The negative electrode had an operating potential of 0.8 V to 2.0 V (vs. $Li/Li^+$) with respect to the potential of metallic lithium.

Comparative Example 6

A nonaqueous electrolyte battery was produced in the same manner as in Example 1 except that a negative electrode active material having the composition shown in Table 3 below was used as the negative electrode active material. The negative electrode had an operating potential of 0.1 V to 3.0 V (vs. $Li/Li^+$) with respect to the potential of metallic lithium. For the negative electrode of Comparative Example 6, insertion-extraction reaction of lithium ions occurs at a negative electrode potential of less than 0.7 V (vs. $Li/Li^+$), and therefore this negative electrode does not correspond to the negative electrode having an operating potential of 0.7 V (vs. $Li/Li^+$) or more with respect to the potential of metallic lithium.

<Measurement of Capacity Reduction Ratio Due to Self-Discharge Caused by Internal Short Circuit>

For each of the resultant batteries, the battery capacity when discharging the battery at 1 C in an environment at 25° C. until the battery voltage reached 1.5 V was measured.

Thereafter, the battery was charged again until the charge ratio (SOC; State Of Charge) became 100%. The resultant battery was stored in an environment at 0° C. for 60 days, and then, after returning the ambient temperature to 25° C., the battery capacity when discharging until the battery voltage reached 1.5 V was measured. The ratio of the discharge capacity after storage to the discharge capacity before storage at this time was taken as the capacity reduction ratio. The results thereof are shown in Tables 2 and 3 below.

<Measurement of Discharge Capacity Retention Ratio of 10 C Discharge Capacity with Respect to 0.2 C Discharge Capacity>

The resultant batteries were discharged at 0.2 C from an SOC of 100% in an environment at 25° C., and then charged up to SOC 100% again. Thereafter, the batteries were discharged at 10 C from the SOC of 100% in an environment at 25° C. The 10 C discharge capacity with respect to the 0.2 C discharge capacity was calculated, the results of which are shown as the discharge capacity retention ratio in Tables 2 and 3 below.

TABLE 1

| | Separator | | | | | | | |
|---|---|---|---|---|---|---|---|---|
| | Thickness ($\mu m$) | Tortuosity | Vacancy (%) | Type of fiber | Average fiber diameter ($\mu m$) | Air permeability (sec/100 cc) | Density ($g/m^3$) | Basis weight ($g/m^2$) |
| Example 1 | 19 | 2.5 | 57 | Natural pulp fiber | 15 | 0.2 | $5.58 \times 10^5$ | 10.6 |
| Example 2 | 19 | 2.0 | 56 | Natural pulp fiber | 20 | 0.04 | $5.68 \times 10^5$ | 10.8 |
| Example 3 | 21 | 1.8 | 48 | Natural pulp fiber | 16 | 0.2 | $6.76 \times 10^5$ | 14.2 |
| Example 4 | 18 | 3.0 | 54 | Natural pulp fiber | 15 | 0.3 | $5.98 \times 10^5$ | 15.4 |
| Example 5 | 23 | 2.5 | 40 | Natural pulp fiber | 20 | 0.3 | $7.77 \times 10^5$ | 15.4 |
| Example 6 | 16 | 2.5 | 60 | Natural pulp fiber | 20 | 0.2 | $5.25 \times 10^5$ | 8.4 |
| Example 7 | 19 | 2.5 | 51 | Polyester fiber | 15 | 0.4 | $6.76 \times 10^5$ | 12.8 |
| Example 8 | 20 | 2.5 | 58 | Synthetic cellulose fiber | 13 | 0.1 | $5.46 \times 10^5$ | 10.8 |
| Comparative Example 1 | 31 | 1.4 | 45 | Natural pulp fiber | 20 | 1.1 | $7.13 \times 10^5$ | 22.1 |
| Comparative Example 2 | 22 | 4.0 | 55 | Natural pulp fiber | 18 | 1.4 | $5.85 \times 10^5$ | 12.8 |
| Comparative Example 3 | 19 | 2.3 | 35 | Natural pulp fiber | 17 | 2.8 | $8.45 \times 10^5$ | 16.0 |
| Comparative Example 4 | 18 | 2.0 | 75 | Natural pulp fiber | 14 | 0.02 | $3.25 \times 10^5$ | 5.9 |
| Comparative Example 5 | 12 | 3.0 | 40 | Microporous polyethylene film | — | 220 | $5.64 \times 10^5$ | 9.5 |

TABLE 2

| | Capacity reduction ratio after storage (%) | Retention ratio of 10 C discharge capacity with respect to 0.2 C discharge capacity (%) |
|---|---|---|
| Example 1 | 4.3 | 75 |
| Example 2 | 5.1 | 55 |
| Example 3 | 2.7 | 50 |
| Example 4 | 4.9 | 70 |
| Example 5 | 3.6 | 61 |
| Example 6 | 6.2 | 82 |
| Example 7 | 5.6 | 57 |
| Example 8 | 2.5 | 69 |
| Comparative Example 1 | 3.57 | (unmeasurable) |
| Comparative Example 2 | 68 | 18 |
| Comparative Example 3 | 8.57 | (unmeasurable) |
| Comparative Example 4 | 100 | (unmeasurable) |
| Comparative Example 5 | 3.16 | 29 |

TABLE 3

|  | Composition of negative electrode active material | Capacity reduction ratio after storage (%) | Retention ratio of 10 C discharge capacity with respect to 0.2 C discharge capacity (%) |
|---|---|---|---|
| Example 9 | $Li_2Na_{1.5}Ti_{5.5}Nb_{0.5}O_{14}$ | 4.4 | 76 |
| Example 10 | $TiO_2(B)$ | 4.5 | 74 |
| Example 11 | $Nb_2TiO_7$ | 4.3 | 75 |
| Comparative Example 6 | graphite | 100 | 70 |

As apparent from the results shown in Tables 1 and 2, the batteries of Examples 1 to 8 had a small capacity reduction ratio after storage, and while also having a high discharge capacity retention ratio of 10 C discharge capacity with respect to 0.2 C discharge capacity, therefore having excellent discharge rate performance. In contrast, for the battery of Comparative Example 1 having a tortuosity of less than 1.8, the battery of Comparative Example 3 having a vacancy of less than 40%, and the battery of Comparative Example 4 having a vacancy of more than 60%, the discharge capacity could not be obtained when discharged at 10 C rate, making it impossible to measure the discharge capacity retention ratio of 10 C discharge capacity with respect to 0.2 C discharge capacity. Namely, the discharge capacity of the batteries when discharged at 10 C rate was nearly zero. Also, the battery of Comparative Example 2 having a tortuosity of more than 3 had a large capacity reduction ratio after storage, and a low discharge capacity retention ratio of 10 C discharge capacity with respect to 0.2 C discharge capacity. On the other hand, the battery of Comparative Example 5, in which a microporous polyethylene film having a tortuosity of 3 and a vacancy of 40% was used as a separator, had a low discharge capacity retention ratio of 10 C discharge capacity with respect to 0.2 C discharge capacity.

Also, it is understood from the comparison amongst Examples 1 and 5 to 8 that even if the tortuosity is the same, different vacancies are obtained by adjusting the type of fiber, average fiber diameter, air permeability, density, or basis weight. Examples 9 to 11 used a negative electrode active material different from that of Example 1. It is understood from the comparison of Examples 1 and 9 to 11 that even when the negative electrode active material is different, self-discharge due to storage can be suppressed when the operating potential of the negative electrode is 0.7 V or more.

Examples 12 to 19

Nonaqueous electrolyte batteries were produced in the same manner as in Example 1 except that nonwoven fabrics having a thickness, tortuosity, vacancy, type of fiber, Gurley value, average fiber diameter, density, and basis weight in the range shown in Table 4 below were used as a separator.

Example 20

A nonaqueous electrolyte battery was produced in the same manner as in Example 1 except that a negative electrode active material having the composition shown in Table 6 below was used as the negative electrode active material. The negative electrode had an operating potential of 0.9 V to 2.0 V (vs. Li/Li$^+$) with respect to the potential of metallic lithium.

<Measurement of Capacity Reduction Ratio Due to Self-Discharge Caused by Internal Short Circuit>

In Examples 12 to 20, the battery capacity was measured in the same manner as in Examples 1 to 8 and Comparative Examples 1 to 5, to determine the capacity reduction ratio. The results thereof are shown in Tables 4, 5, and 6 below.

<Measurement of Discharge Capacity Retention Ratio of 10 C Discharge Capacity with Respect to 0.2 C Discharge Capacity>

In Examples 12 to 20, the 10 C discharge capacity with respect to the 0.2 C discharge capacity was calculated in the same manner as in Examples 1 to 8 and Comparative Examples 1 to 5, the results of which are shown as the discharge capacity retention ratio in Tables 4, 5, and 6 below.

TABLE 4

| | Separator | | | | | | | |
|---|---|---|---|---|---|---|---|---|
| | Thickness (μm) | Tortuosity | Vacancy (%) | Type of fiber | Average fiber diameter (μm) | Air permeability (sec/100 cc) | Density (g/m$^3$) | Basis weight (g/m$^2$) |
| Example 12 | 19 | 1.8 | 58 | Natural pulp fiber | 15 | 0.1 | $4.00 \times 10^5$ | 10.6 |
| Example 13 | 20 | 2.8 | 42 | Natural pulp fiber | 15 | 0.8 | $8.00 \times 10^5$ | 10.6 |
| Example 14 | 10 | 2.2 | 54 | Natural pulp fiber | 15 | 0.2 | $5.58 \times 10^5$ | 7.0 |
| Example 15 | 30 | 2.5 | 47 | Natural pulp fiber | 15 | 0.2 | $5.58 \times 10^5$ | 20.0 |
| Example 16 | 12 | 2.0 | 43 | Natural pulp fiber | 15 | 0.1 | $4.50 \times 10^5$ | 9.0 |
| Example 17 | 35 | 2.4 | 50 | Natural pulp fiber | 18 | 0.4 | $5.00 \times 10^5$ | 18.0 |
| Example 18 | 19 | 2.0 | 55 | Natural pulp fiber/polyester | 12 | 0.4 | $5.00 \times 10^5$ | 18.0 |

TABLE 4-continued

| | Separator | | | | | | | |
|---|---|---|---|---|---|---|---|---|
| | Thickness (μm) | Tortuosity | Vacancy (%) | Type of fiber | Average fiber diameter (μm) | Air permeability (sec/100 cc) | Density (g/m$^3$) | Basis weight (g/m$^2$) |
| Example 19 | 13 | 1.9 | 55 | Natural pulp fiber/synthetic cellulose fiber | 12 | 0.2 | $6.50 \times 10^5$ | 9.0 |

TABLE 5

| | Capacity reduction ratio after storage (%) | Retention ratio of 10 C discharge capacity with respect to 0.2 C discharge capacity (%) |
|---|---|---|
| Example 12 | 5.5 | 70 |
| Example 13 | 3.0 | 45 |
| Example 14 | 3.4 | 72 |
| Example 15 | 4.1 | 58 |
| Example 16 | 4.8 | 69 |
| Example 17 | 2.9 | 55 |
| Example 18 | 3.9 | 79 |
| Example 19 | 4.0 | 80 |

As apparent from the results shown in Tables 4 and 5, the batteries of Examples 12 to 19 had a small capacity reduction ratio after storage, and a high discharge capacity retention ratio of 10 C discharge capacity with respect to 0.2 C discharge capacity, thus exhibiting excellent discharge rate performance.

Also, it is understood from the comparison between Examples 14 and 15 that even if the type of fiber, average fiber diameter, air permeability, and density are the same, different tortuosities or vacancies are obtained by adjusting the thickness or basis weight.

<Measurement of Cycle Life>

The cycle life of each of Examples 1, 9, 10, 11, and 20, and Comparative Example 6 was measured by the method described below.

The batteries were charged at 0.2 C in an environment at 25° C. to make the SOC 100%. After letting the batteries stand for 10 minutes, the batteries were discharged at 0.2 C in an environment at 25° C., whereupon the discharge capacity was recorded.

Next, the batteries were charged at 1 C in an environment at 35° C., and then allowed to stand for 10 minutes. Subsequently, the batteries were discharged at 1 C in an environment at 35° C., and then allowed to stand for 10 minutes. With this charge and discharge as 1 cycle, the charge and discharge were repeated until 500 cycles had been fulfilled.

After 500 cycles elapsed, the batteries were charged at 0.2 C in an environment at 25° C. up to SOC 100%. After letting the batteries stand for 10 minutes, the batteries were discharged at 0.2 C in an environment at 25° C., whereupon the discharge capacity was recorded.

The percentage of 0.2 C discharge capacity after 500 cycles relative to 0.2 C discharge capacity before the cycles is presented as the discharge capacity retention ratio in Table 6 below.

TABLE 6

| | Composition of negative electrode active material | Capacity reduction ratio after storage (%) | Retention ratio of 10 C discharge capacity with respect to 0.2 C discharge capacity (%) | Capacity retention ratio after 500 cycles (%) |
|---|---|---|---|---|
| Example 1 | $Li_4Ti_5O_{12}$ | 4.3 | 75 | 98 |
| Example 9 | $Li_2Na_{1.5}Ti_{5.5}Nb_{0.5}O_{14}$ | 4.4 | 76 | 91 |
| Example 10 | $TiO_2(B)$ | 4.5 | 74 | 92 |
| Example 11 | $Nb_2TiO_7$ | 4.3 | 75 | 89 |
| Example 20 | $Li_4Ti_5O_{12}$ (50)/ $TiO_2(B)$ (50) | 4.2 | 74 | 96 |
| Comparative Example 6 | graphite | 100 | 70 | 35 |

As apparent from the results shown in Table 6, the battery of Example 20 had a small capacity reduction ratio after storage, and a high discharge capacity retention ratio of 10 C discharge capacity with respect to 0.2 C discharge capacity, and exhibited excellent discharge rate performance.

Also, the batteries of Examples 1, 9 to 11, and 20 had a high capacity retention ratio after 500 cycles. When Examples 1 and 20 are compared with Examples 9 to 11, it is understood that the cycle performance of the batteries improves when the negative electrode active material includes $Li_4Ti_5O_{12}$.

The nonaqueous electrolyte battery according to at least one of the embodiments and examples described above includes a separator having a nonwoven fabric made of fiber, the nonwoven fabric having a tortuosity of 1.8 to 3 and a vacancy of 40% to 60%. Therefore, there can be realized a nonaqueous electrolyte battery where capacity reduction due to self-discharge caused by an internal short circuit is reduced, that is also excellent in rate performance.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A nonaqueous electrolyte battery comprising:
   a positive electrode;
   a negative electrode having an operating potential of 0.7 V or more with respect to a potential of metallic lithium;
   a separator disposed between the positive electrode and the negative electrode, the separator comprising a fiber-made nonwoven fabric having a tortuosity of 1.8 to 3 and a vacancy of 40% to 60%; and
   a nonaqueous electrolyte,
   wherein the fiber-made non-woven fabric has an air permeability according to a Gurley method (JIS-P-8117) in a range of 0.01 (sec/100 cc) to 1 (sec/100 cc).

2. The nonaqueous electrolyte battery according to claim 1, wherein the negative electrode has an operating potential of 0.7 V to 3 V with respect to a potential of metallic lithium.

3. The nonaqueous electrolyte battery according to claim 1, wherein the fiber-made nonwoven fabric comprises a fiber made of at least one material selected from the group consisting of cellulose, polyester, polyvinyl alcohol, polyamide, polytetrafluoroethylene, and vinylon.

4. The nonaqueous electrolyte battery according to claim 3, wherein the fiber made of the at least one material has an average fiber diameter of 20 μm or less.

5. The nonaqueous electrolyte battery according to claim 3, wherein the fiber made of the at least one material comprises at least 30% by mass of cellulose fiber.

6. The nonaqueous electrolyte battery according to claim 1, wherein the separator has a density in a range of $4 \times 10^5$ (g/m$^3$) to $8 \times 10^5$ (g/m$^3$).

7. The nonaqueous electrolyte battery according to claim 1, wherein the separator has a basis weight in a range of 7 (g/m$^2$) to 20 (g/m$^2$).

8. The nonaqueous electrolyte battery according to claim 1, wherein the separator has a thickness in a range of 10 μm to 35 μm.

9. The nonaqueous electrolyte battery according to claim 1, wherein the negative electrode comprises a negative electrode active material, the negative electrode active material comprising lithium titanate having a spinel structure.

10. The nonaqueous electrolyte battery according to claim 9, wherein the negative electrode active material further comprises at least one selected from the group consisting of titanium oxide having a monoclinic structure, orthorhombic titanium-containing oxide, monoclinic niobium titanium composite oxide, and lithium titanate having a ramsdellite structure.

11. The nonaqueous electrolyte battery according to claim 9, wherein the negative electrode active material comprises at least 10% by mass of the lithium titanate having a spinel structure.

12. The nonaqueous electrolyte battery according to claim 9, wherein the negative electrode active material comprises the lithium titanate having a spinel structure in a range of 10% by mass or more and less than 100% by mass.

13. A battery pack comprising one of the nonaqueous electrolyte battery according to claim 1, or comprising two or more of the nonaqueous electrolyte batteries.

* * * * *